(12) United States Patent
Kubota et al.

(10) Patent No.: US 7,905,307 B2
(45) Date of Patent: Mar. 15, 2011

(54) BATTERY COOLING AIR INTAKE STRUCTURE

(75) Inventors: Shinya Kubota, Wako (JP); Hiroshi Kosaka, Wako (JP); Yoshinori Nakamura, Wako (JP); Hirobumi Kikuchi, Wako (JP)

(73) Assignee: Honda Motor Co, Ltd., Tokyo (JP)

( * ) Notice: Subject to any disclaimer, the term of this patent is extended or adjusted under 35 U.S.C. 154(b) by 0 days.

(21) Appl. No.: 12/809,934

(22) PCT Filed: Dec. 12, 2008

(86) PCT No.: PCT/JP2008/072653
§ 371 (c)(1),
(2), (4) Date: Jun. 21, 2010

(87) PCT Pub. No.: WO2009/081764
PCT Pub. Date: Jul. 2, 2009

(65) Prior Publication Data
US 2010/0276220 A1    Nov. 4, 2010

(30) Foreign Application Priority Data

Dec. 25, 2007   (JP) .................................. 2007-332590

(51) Int. Cl.
*B60K 11/00* (2006.01)
(52) U.S. Cl. ..................... 180/68.1; 180/68.3; 180/68.2; 165/202
(58) Field of Classification Search ................. 180/68.1, 180/68.2, 68.3, 68.5; 165/202, 47, 204
See application file for complete search history.

(56) References Cited

U.S. PATENT DOCUMENTS

| | | | | |
|---|---|---|---|---|
| 5,937,664 | A * | 8/1999 | Matsuno et al. | 62/259.2 |
| 6,220,383 | B1 * | 4/2001 | Muraki et al. | 180/68.5 |
| 6,315,069 | B1 * | 11/2001 | Suba et al. | 180/68.5 |
| 6,457,542 | B1 * | 10/2002 | Hosono et al. | 180/68.1 |
| 6,541,151 | B2 * | 4/2003 | Minamiura et al. | 429/98 |
| 6,662,891 | B2 * | 12/2003 | Misu et al. | 180/68.1 |
| 7,004,233 | B2 * | 2/2006 | Hasegawa et al. | 165/47 |

(Continued)

FOREIGN PATENT DOCUMENTS

JP        2002-134084 A      5/2002

(Continued)

*Primary Examiner* — Hau V Phan
(74) *Attorney, Agent, or Firm* — Arent Fox LLP (57) ABSTRACT

In a battery cooling air intake structure, in which a trunk side lining (35) of a vehicle body side part is disposed so as to be continuous with a side part of a seat back (32) of a seat for a passenger to sit on, and a battery is cooled using, as cooling air, air within a vehicle compartment taken in via an intake port (36) provided in a front face (35*a*) of the trunk side lining (35), since a seat belt (38) is disposed so that at least part thereof in a non-used state overlaps the intake port (36) when viewed in the vehicle body fore-and-aft direction and a predetermined gap (b) is formed between the intake port (36*a*) and at least part of the seat belt (38) when viewed in the vehicle width direction, it is possible to prevent interference with the intake of cooling air due to the intake port (36) being blocked by the seat belt (38), while disposing the seat belt (38) as far toward the outside in the vehicle width direction as possible so that it does not overlap the seat back (32).

11 Claims, 5 Drawing Sheets

U.S. PATENT DOCUMENTS

| | | | |
|---|---|---|---|
| 7,025,159 B2 * | 4/2006 | Smith et al. | 180/68.1 |
| 7,163,073 B2 * | 1/2007 | Schmid et al. | 180/68.3 |
| 7,654,351 B2 * | 2/2010 | Koike et al. | 180/68.5 |
| 2004/0238246 A1 * | 12/2004 | Ceccarani et al. | 180/68.1 |
| 2008/0296075 A1 * | 12/2008 | Zhu et al. | 180/68.1 |

FOREIGN PATENT DOCUMENTS

| | | |
|---|---|---|
| JP | 2004-01683 A | 1/2004 |
| JP | 2005-71759 A | 3/2005 |

\* cited by examiner

BATTERY COOLING AIR INTAKE STRUCTURE

CROSS-REFERENCE TO RELATED APPLICATION

This application is a National Stage entry of International Application No. PCT/JP2008/072653, filed Dec. 12, 2008, which claims priority to Japanese Patent Application No. 2007-332590, filed Dec. 25, 2007. The disclosure of the prior application is hereby incorporated in its entirety by reference.

TECHNICAL FIELD

The present invention relates to a battery cooling air intake structure in which an intake port for taking from within a vehicle compartment, as cooling air, air for cooling a battery is provided in an interior member, in a vehicle body side part, continuous with a side part of a seat back of a seat for a passenger to sit on.

BACKGROUND ART

An arrangement in which a battery for an electric automobile or a hybrid vehicle is mounted in a luggage space of a vehicle body rear part, and cooling air for cooling this battery is taken in via an intake port provided in a front face of a seat side garnish continuous with a side part of a rear seat is described as a third embodiment in Patent Publication 1 below. Patent Publication 1: Japanese Patent Application Laid-open No. 2004-1683

DISCLOSURE OF INVENTION

Problems to be Solved By the Invention

In the above-mentioned conventional arrangement, since a front face of the seat back is flush with the front face of the seat side garnish in which the intake port is provided, when a seat belt disposed along the front face of the seat back is in a non-used state, the intake port is blocked by the seat belt and there is a possibility that cooling air will not be able to be supplied to the battery. If in order to prevent this the seat belt in a non-used state is disposed further inside in the vehicle width direction than the intake port, there is a possibility that the ease of use of the seat belt will be degraded.

The present invention has been accomplished in the light of the above-mentioned circumstances, and it is an object thereof to prevent an intake port for cooling air for a battery from being blocked while disposing a seat belt in a non-used state as far to the outside in the vehicle width direction as possible.

MEANS FOR SOLVING THE PROBLEMS

In order to attain the above object, according to a first aspect of the present invention, there is provided a battery cooling air intake structure in which an intake port for taking from within a vehicle compartment, as cooling air, air for cooling a battery is provided in an interior member, in a vehicle body side part, continuous with a side part of a seat back of a seat for a passenger to sit on, characterized in that the structure is arranged so that at least part of a seat belt in a non-used state overlaps the intake port and a predetermined gap is formed between the intake port and a rear face of the seat belt.

According to a second aspect of the present invention, in addition to the first aspect, a width of the intake port in the vehicle width direction is larger than a width of the seat belt in the vehicle width direction.

According to a third aspect of the present invention, in addition to the first or second aspect, the predetermined gap is formed by offsetting a front face of the interior member on which the intake port is provided further toward the rear of the vehicle body than a front face of the seat back.

According to a fourth aspect of the present invention, in addition to any one of the first to third aspects, the predetermined gap is formed by projectingly providing a gap-forming member, which abuts against a rear face of the seat belt, on the front face of the interior member on which the intake port is provided, to thus allow the seat belt in a non-used state to be lifted from the intake port toward the front of the vehicle body.

According to a fifth aspect of the present invention, in addition to the fourth aspect, an extremity portion of the gap-forming member abutting against the rear face of the seat belt is positioned further toward the front of the vehicle body than the front face of the seat back.

According to a sixth aspect of the present invention, in addition to the first or second aspect, the intake port is inclined so that the lower it is the further it is positioned toward the front of the vehicle body, and is inclined so that the further inside it is in the vehicle width direction the further it is positioned toward the rear of the vehicle body.

According to a seventh aspect of the present invention, in addition to the first or second aspect, a lower face of an inlet portion of an intake duct extending to the rear of the vehicle body from the intake port is inclined so that the side to the rear of the vehicle body is higher.

According to an eighth aspect of the present invention, in addition to the first or second aspect, a rear face of the door disposed to one side of the seat is disposed so that, when viewed in the vehicle body fore-and-aft direction, the rear face overlaps part of the intake port on the outer side in the vehicle width direction and, when viewed in the vehicle width direction, a predetermined gap is formed between the rear face and the intake port.

According to a ninth aspect of the present invention, in addition to the first or second aspect, an auxiliary intake port communicating with the intake duct extending toward the rear of the vehicle body from the intake port is provided on a portion of the interior member facing a side face of the seat back.

A battery module 22 of an embodiment corresponds to the battery of the present invention, a rear seat 33 of the embodiment corresponds to the seat of the present invention, a rear door 34 of the embodiment corresponds to the door of the present invention, a trunk side lining 35 of the embodiment corresponds to the interior member of the present invention, and an upper gap-forming projection 35e and a lower gap-forming projection 35f of the embodiment correspond to the gap-forming member of the present invention.

EFFECTS OF THE INVENTION

In accordance with the first aspect of the present invention, when a battery is cooled using, as cooling air, air within the vehicle compartment taken in via the intake port provided in the interior member of the vehicle body side part continuous with the side part of the seat back of the seat for a passenger to sit on, since the seat belt is disposed so that at least part thereof in a non-used state overlaps the intake port and a predetermined gap is formed between a rear face of the seat belt and the intake port, it is possible to prevent interference of the intake of cooling air due to the intake port being blocked by the seat belt while guaranteeing ease of use of the seat belt by disposing it as far toward the outside in the vehicle width direction as possible so that it does not overlap the seat back.

Furthermore, in accordance with the second aspect of the present invention, since the width of the intake port in the vehicle width direction is larger than the width of the seat belt in the vehicle width direction, it is possible to reliably prevent the intake port from being completely blocked by the seat belt.

Moreover, in accordance with the third aspect of the present invention, since the front face of the interior member, in which the intake port is provided, is offset further to the rear of the vehicle body than the front face of the seat back, not only is it possible to guarantee a gap between the seat belt and the intake port, but it is also possible to prevent the intake port from being blocked by the body of a passenger sitting on the seat.

Furthermore, in accordance with the fourth aspect of the present invention, since the gap-forming member, which abuts against the rear face of the seat belt, is projectingly provided on the front face of the interior member, in which the intake port is provided, it is possible to guarantee a gap between the seat belt and the intake port by lifting the seat belt in a non-used state from the intake port toward the front of the vehicle body, and it is possible to yet more reliably prevent the intake port from being completely blocked by the seat belt.

Moreover, in accordance with the fifth aspect of the present invention, since the extremity portion via which the gap-forming member abuts against the rear face of the seat belt is positioned further to the front of the vehicle body than the front face of the seat back, it is possible to guarantee a large distance between the seat belt and the intake port, thus still more reliably preventing the intake port from being completely blocked by the seat belt.

Furthermore, in accordance with the sixth aspect of the present invention, since the intake port is inclined so as to be positioned further to the front of the vehicle body the further downward it is and is inclined so as to be positioned further to the rear of the vehicle body the further inward it is in the vehicle width direction, it is possible to guarantee a maximum area for the intake port within a confined space.

Moreover, in accordance with the seventh aspect of the present invention, since the lower face of the inlet portion of the intake duct extending from the intake port to the rear of the vehicle body is inclined so as to become higher in going to the rear of the vehicle body, it is possible to prevent foreign matter or water that has entered the intake duct via the intake port from penetrating deep into the intake duct.

Furthermore, in accordance with the eighth aspect of the present invention, since the rear face of the door disposed to one side of the seat overlaps a part of the intake port on the outer side in the vehicle width direction when viewed in the vehicle body fore-and-aft direction, and a predetermined gap is formed between the rear face of the door and the intake port when viewed in the vehicle width direction, even if a passenger sitting on the seat leans on the door, it is possible to reliably guarantee a space between the body of the passenger and the intake port.

Moreover, in accordance with the ninth aspect of the present invention, since the auxiliary intake port communicating with the intake duct extending from the intake port to the rear of the vehicle body is provided in a portion of the interior member facing a side face of the seat back, even if the intake port is blocked, it is possible to supply cooling air to the battery via the auxiliary intake port.

BRIEF DESCRIPTION OF DRAWINGS

[FIG. 1]

[FIG. 2]

[FIG. 3]

[FIG. 4]

[FIG. 5]

EXPLANATION OF REFERENCE NUMERALS AND SYMBOLS

19 Intake duct
19a Inlet portion
22 Battery module (battery)
32 Seat back
32a Seat back front face
33 Rear seat (seat)
34 Rear door (door)
35 Trunk side lining (interior member)
35a Interior member front face
35e Upper gap-forming projection (gap-forming member)
35f Lower gap-forming projection (gap-forming member)
36 Intake port
38 Seat belt
40 Auxiliary intake port
b Gap
d Gap
Wi Width of intake port in vehicle width direction
Wb Width of seat belt in vehicle width direction

BEST MODE FOR CARRYING OUT THE INVENTION

A mode for carrying out the present invention is explained below by reference to the attached drawings.

First Embodiment

Figure 1:
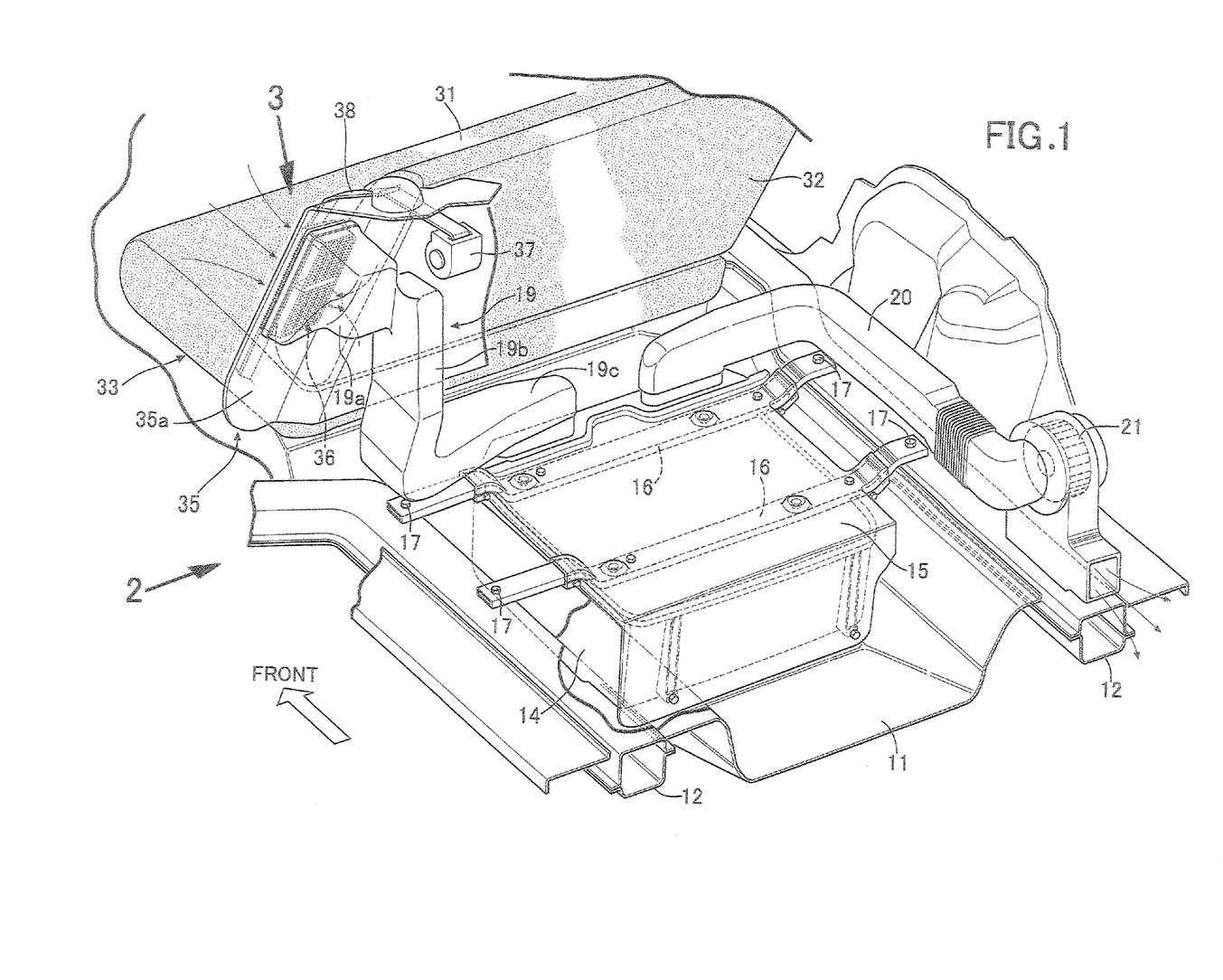
FIG. 1 is an overall perspective view of a vehicular power supply system. (first embodiment)
Figure 2:
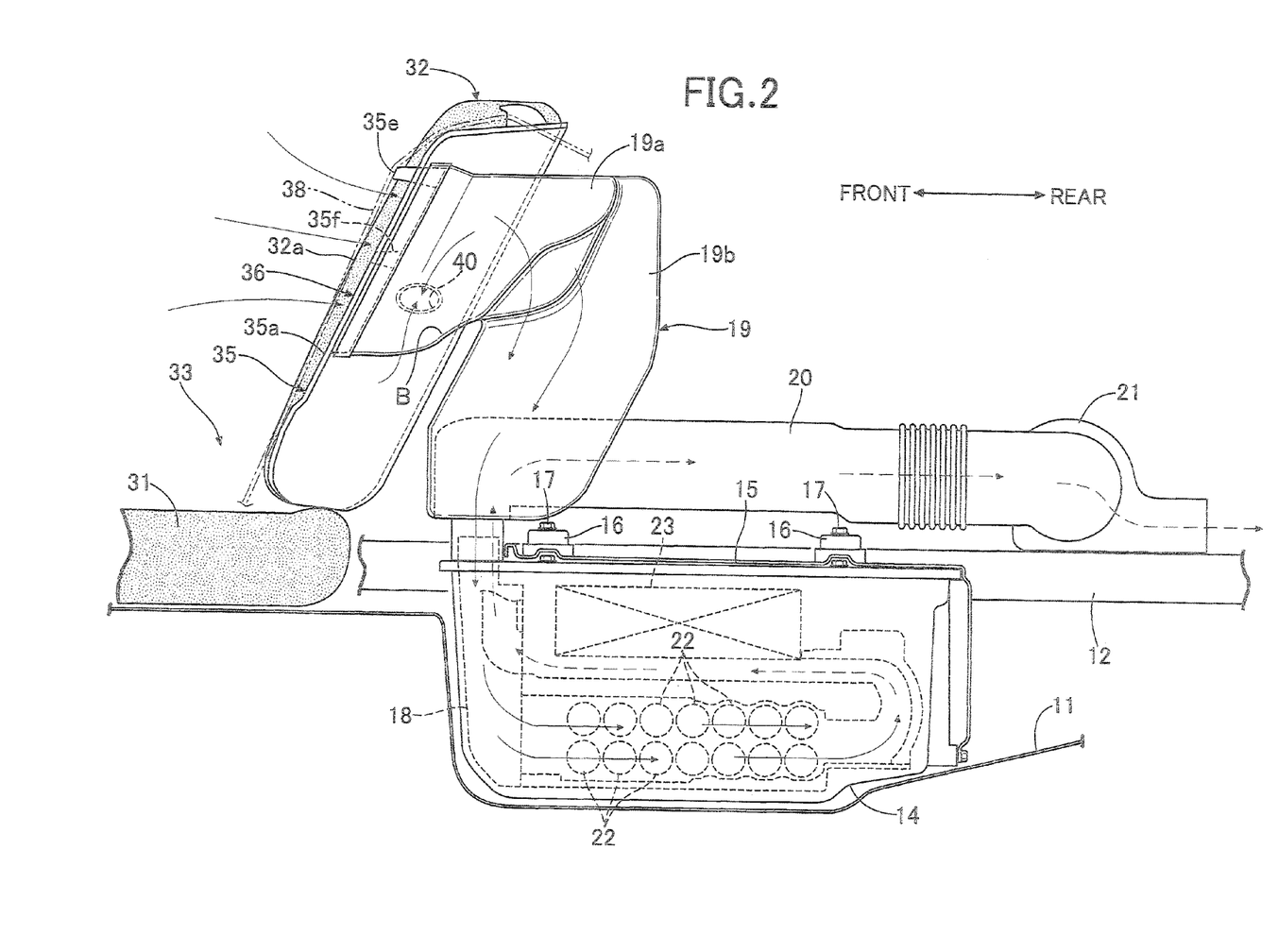
FIG. 2 is a view from arrow 2 in FIG. 1. (first embodiment)

As shown in FIG. 1 and FIG. 2, a power supply system for operating a motor/generator of a hybrid vehicle is housed by utilizing a tire pan 11 that houses a spare tire beneath a trunk compartment of a vehicle body rear part. The tire pan 11, which has a downwardly recessed container shape, has its left and right side edges connected to left and right rear side frames 12 and 12. The power supply system includes a waterproof case 14 having a container shape with an open upper face, and a flat plate-shaped lid member 15 closing the upper face opening, and opposite end parts, in the vehicle width direction, of a pair of front and rear hanger frames 16 and 16 extending in the vehicle width direction while being held between the waterproof case 14 and the lid member 15 are fixed to upper faces of the left and right rear side frames 12 and 12 by bolts 17. The power supply system is therefore hangingly supported by the left and right rear side frames 12 and 12 via the pair of front and rear hanger frames 16 and 16.

The front edge of the lid member 15 ends at the position of the front hanger frame 16, and a duct member 18 is housed within the waterproof case 14 in front of the position. Connected to an upper face of the duct member 18 are the downstream end of an intake duct 19 for taking, as cooling air, air within the vehicle compartment into the waterproof case 14, and the upstream end of an exhaust duct 20 for discharging from the interior of the waterproof case 14 cooling air that has completed cooling, the intake duct 19 extending to the upper front left of the vehicle body from a front left part of the waterproof case 14, and the exhaust duct 20 extending rearwardly from a front right part of the waterproof case 14 along the right side face of the vehicle body. The downstream end of the exhaust duct 20 is provided with an electrically operated fan 21, and cooling air is taken into the intake duct 19 by means of negative pressure generated by the fan 21. Cooling air discharged from the intake duct 19 is discharged between an interior material of the trunk compartment and a rear fender, part thereof is returned to the interior of the vehicle compartment, and part thereof is discharged outside the vehicle.

Rod-shaped battery modules 22 in which a plurality of battery cells are connected in series in the vehicle width direction are arranged in a bottom part of the waterproof case 14 so that there are 7 rows in the fore-and-aft direction and two layers in the vertical direction, and a high voltage electrical component 23 such as an inverter or a DC-DC converter is disposed in an upper part of the waterproof case 14. Cooling air that has been taken into the interior of the waterproof case 14 from the intake duct 19 via the duct member 18 cools the battery modules 22 while flowing through the interior from the front to the rear, subsequently makes a U-turn, cools the high voltage electrical component 23 while flowing above the battery modules 22 from the rear to the front, and is discharged from the interior of the waterproof case 14 via the duct member 18, the exhaust duct 20, and the fan 21.

A rear seat 33 equipped with a seat cushion 31 and a seat back 32 is disposed in front of the trunk compartment. The intake duct 19 includes an inlet portion 19*a* opening in a left side part of the seat back 32 and extending to the rear of the vehicle body, an intermediate portion 19*b* connected to a right side face of the rear end of the inlet portion 19*a* and extending downward, and an outlet portion 19*c* connected to the lower end of the intermediate portion 19*b*, extending toward the inside in the vehicle width direction, and joined to the upper face of the duct member 18.

Figure 3:
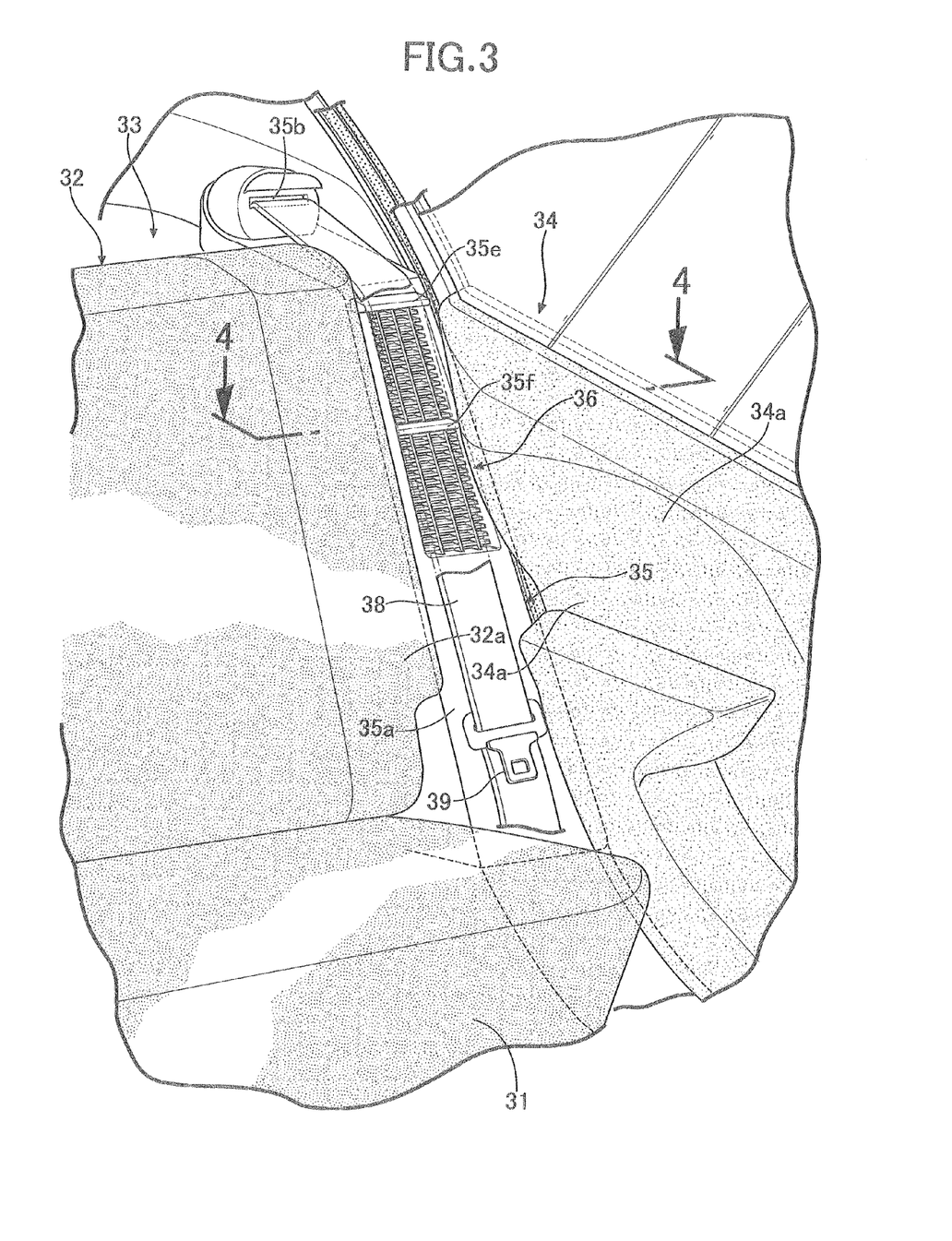
FIG. 3 is a view from arrow 3 in FIG. 1. (first embodiment)

As is clear from FIG. 3, part of a trunk side lining 35 is exposed as a vertically long band-shaped front face 35*a* between a left side part of the seat back 32 of the rear seat 33 and a rear edge of a left rear door 34, and an intake port 36 communicating with the front end of the inlet portion 19*a* of the intake duct 19 opens in substantially the upper half of the front face 35*a* so as to face the interior of the vehicle compartment.

A seat belt 38 for the rear seat, which is pulled out into the vehicle compartment via a pull-out opening 35*b* from a retractor 37 (see FIG. 1) disposed on the rear side of an upper part of the trunk side lining 35, extends in a non-used state downward along the front face 35*a* of the trunk side lining 35 exposed within the vehicle compartment, and is fixed via a lower end thereof to an anchor, which is not illustrated. A tongue 39 is slidably supported on the seat belt 38, and coupling the tongue 39 to a buckle, which is not illustrated, while pulling out the seat belt 38 from the retractor 37 enables it to be put into a used state, in which a chest part and an abdominal part of a passenger are restrained.

Figure 4:
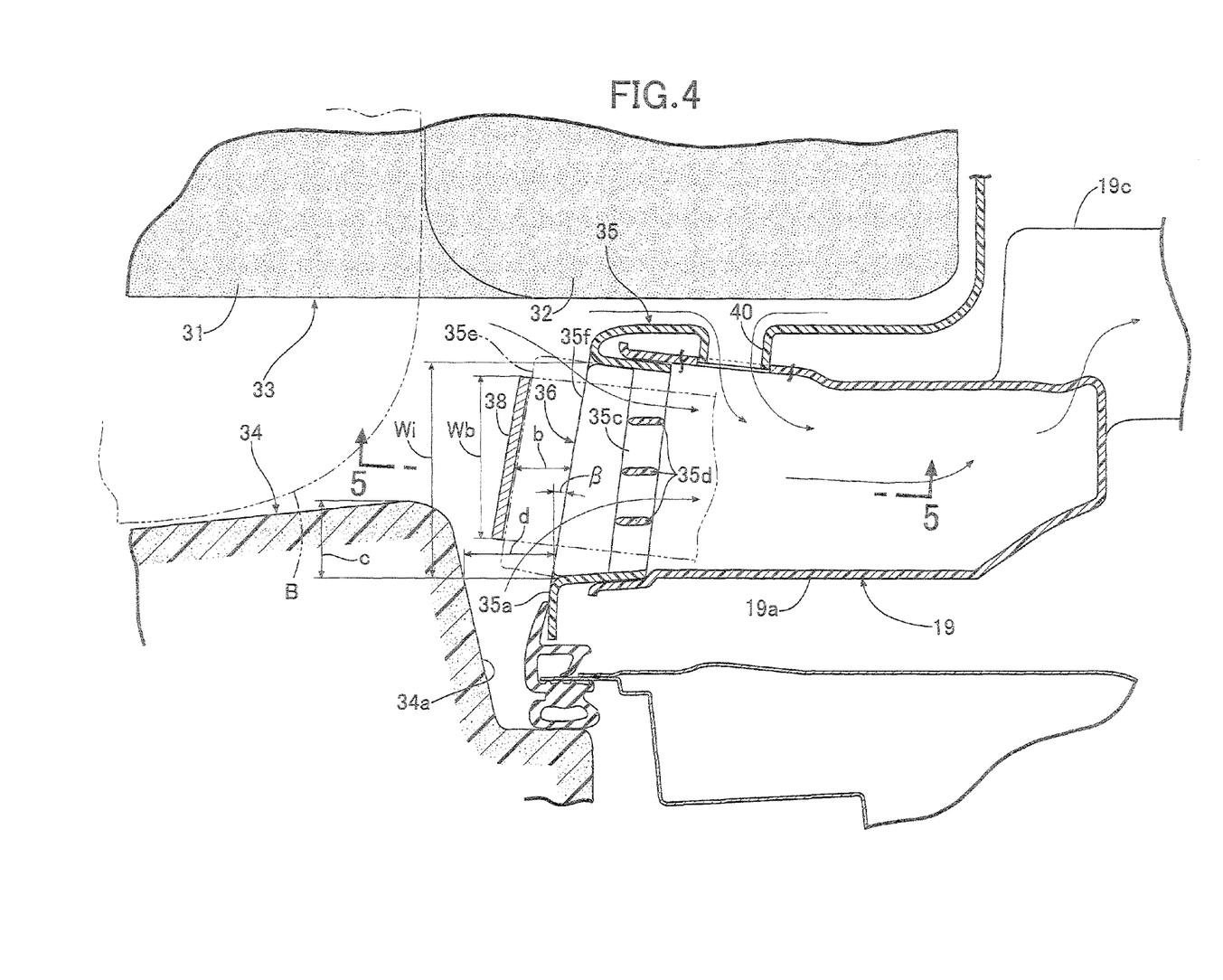
FIG. 4 is a sectional view along line 4-4 in FIG. 3. (first embodiment)
Figure 5:
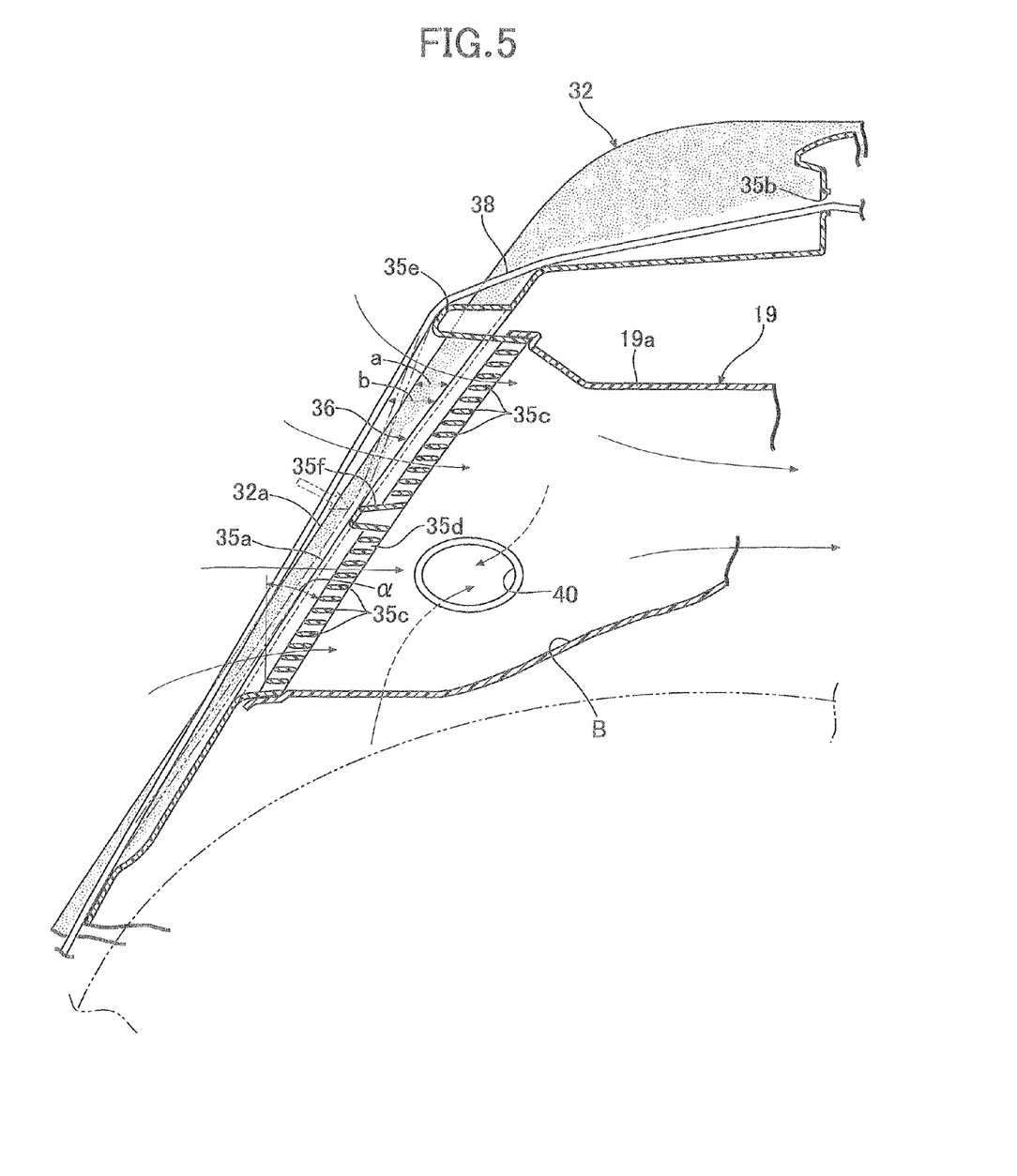
FIG. 5 is a sectional view along line 5-5 in FIG. 4. (first embodiment)

As is clear from FIG. 3 to FIG. 5, the front face 35*a* of the trunk side lining 35 extends substantially in parallel to a front face 32*a* of the seat back 32, but at least in a portion where the intake port 36 is present the front face 35*a* is offset to the rear of the vehicle body only by a distance a relative to the front face 32*a* of the seat back 32. In other words, the front face 32*a* of the seat back 32 is positioned forward only by the distance a relative to the front face 35*a* of the trunk side lining 35 (see FIG. 5).

This allows the position of the intake port 36 to be spaced to the rear of the vehicle body from the seat belt 38, and not only enables blocking of the intake port 36 by the seat belt 38 to be prevented, but also enables blocking of the intake port 36 by a body B of a passenger when the passenger leans on the rear door 34 to be prevented (see FIG. 4).

The intake port 36 is a vertically long rectangle, and is formed as a louver with a plurality of lateral fins 35*c* and a plurality of vertical fins 35*d* so that foreign matter does not enter. The intake port 36 is inclined only by an angle α (see FIG. 5) so that its lower side is positioned further to the front of the vehicle body and is inclined only by an angle β (see FIG. 4) so that its inner side in the vehicle width direction is positioned further to the rear of the vehicle body, and this guarantees a maximum opening area in the confined space between the side part of the seat back 32 and the rear door 34.

A width Wi, in the vehicle width direction, of the intake port 36 is set so as to be larger than a width Wb, in the vehicle width direction, of the seat belt 38 (see FIG. 4). That is, when viewed in the vehicle body fore-and-aft direction, the seat belt 38 does not completely cover and hide the intake port 36, and at least part of the intake port 36 is exposed. Even in the event of the seat belt 38 being pressed rearward, it is therefore possible to prevent the intake port 36 from being completely blocked by the seat belt 38.

Furthermore, an upper gap-forming projection 35*e* projecting toward the front of the vehicle body is formed on the front face 35*a* of the trunk side lining 35 corresponding to the upper end of the intake port 36, and a lower gap-forming projection 35*f* projecting toward the front of the vehicle body is formed on the front face 35*a* of the trunk side lining 35 corresponding to a vertically intermediate part of the intake port 36. The extremity of the upper gap-forming projection 35*e* projects further to the front of the vehicle body than the front face 32*a* of the seat back 32, and by abutting the rear face of the seat belt 38 in a non-used state against the extremity a gap between the seat belt 38 and the intake port 36 is a distance b, which is larger than the distance a between the front face 32*a* of the seat back 32 and the intake port 36.

The amount by which the lower gap-forming projection 35*f* projects is set so as to be smaller than that of the upper gap-forming projection 35*e*, and the seat belt 38 in a non-used state does not abut against the extremity of the lower gap-forming projection 35*f*, but when the seat belt 38 is pressed rearward, preventing its movement to the rear of the vehicle body by cooperation between the upper gap-forming projection 35*e* and the lower gap-forming projection 35*f* makes it possible to prevent the intake port 36 from being blocked by the seat belt 38 (see FIG. 5).

An inner face at the rear end of a door lining 34*a* of the rear door 34 is offset toward the inside in the vehicle width direction only by a distance c from the outer end of the intake port 36 in the vehicle width direction. That is, when viewed in the vehicle body fore-and-aft direction, the door lining 34*a* of the rear door 34 overlaps part of the intake port 36 on the outer side in the vehicle width direction. Furthermore, positioning the rear end face of the door lining 34*a* of the rear door 34 further forward than the intake port 36 only by a distance d allows a space between the two to be guaranteed (see FIG. 4).

Even when the passenger leans on the rear door 34, it is therefore possible to prevent the body B from being stuck between the seat back 32 and the door lining 34*a* of the rear door 34, and by yet more reliably preventing the intake port 36 from being blocked by the body and guaranteeing a space between the body B and the intake port 36, cooling air can be taken in via the intake port 36.

A base B (see FIG. 2 and FIG. 5) of the inlet portion 19a of the intake duct 19 is inclined so that the front side of the vehicle body, that is, the intake port 36 side, becomes lower. Because of this, even if foreign matter or water enters the interior of the intake duct 19 via the intake port 36, it is possible to prevent the foreign matter or water from deeply penetrating the intake duct 19 (see FIG. 5).

Connected to a wall face, on the inside in the vehicle width direction, of the inlet portion 19a of the intake duct 19 is an auxiliary intake port 40 extending from the trunk side lining 35 facing the wall face, the vehicle compartment and the inlet portion 19a of the intake duct 19 communicating with each other via the auxiliary intake port 40. Even if the intake port 36 is blocked, cooling air can thereby be taken into the intake duct 19 via the auxiliary intake port 40 (see FIG. 4).

As described above, even when the intake port 36 is formed on the front face 35a of the trunk side lining 35 exposed between the rear door 34 and the side part of the seat back 32 of the rear seat 33, and the seat belt 38 in a non-used state is disposed in front of the intake port 36, it is possible to reliably prevent a situation in which the seat belt 38 blocks the intake port 36 to thus disable the supply of cooling air to the battery modules 22 or the high voltage electrical component 23; it is therefore unnecessary to dispose the seat belt 38 in a non-used state on the seat back 32, which is further inside in the vehicle width direction than the front face 35a of the trunk side lining 35, and the seat belt 38 can be disposed as far to the outside in the vehicle width direction as possible, thus improving the ease of use.

An embodiment of the present invention is explained above, but the present invention is not limited to the above-mentioned embodiment and can be modified in a variety of ways as long as the modifications do not depart from the spirit and scope of the present invention.

For example, in the embodiment a hybrid vehicle is illustrated, but the present invention may be applied to an electric automobile.

Furthermore, the auxiliary intake port 40 (see FIG. 4) is not always required, and it may be omitted if a certain degree of gap is guaranteed between the side face of the seat back 32 and the wall face, on the inside in the vehicle width direction, of the inlet portion 19a of the intake duct 19.

The invention claimed is:

1. A battery cooling air intake structure in which an intake port (36) for taking from within a vehicle compartment, as cooling air, air for cooling a battery (22) is provided in an interior member (35), in a vehicle body side part, continuous with a side part of a seat back (32) of a seat (33) for a passenger to sit on,
characterized in that the structure is arranged so that at least part of a seat belt (38) in a non-used state overlaps the intake port (36) and a predetermined gap (b) is formed between the intake port (36) and a rear face of the seat belt (38).

2. The battery cooling air intake structure according to claim 1, wherein a width (Wi) of the intake port (36) in the vehicle width direction is larger than a width (Wb) of the seat belt (38) in the vehicle width direction.

3. The battery cooling air intake structure according to claim 1 or claim 2, wherein the predetermined gap (b) is formed by offsetting a front face (35a) of the interior member (35) on which the intake port (36) is provided further toward the rear of the vehicle body than a front face (32a) of the seat back (32).

4. The battery cooling air intake structure according to claim 3, wherein the predetermined gap (b) is formed by projectingly providing a gap-forming member (35e, 35f), which abuts against a rear face of the seat belt (38), on the front face (35a) of the interior member (35) on which the intake port (36) is provided, to thus allow the seat belt (38) in a non-used state to be lifted from the intake port (36) toward the front of the vehicle body.

5. The battery cooling air intake structure according to claim 4, wherein an extremity portion of the gap-forming member (35e) abutting against the rear face of the seat belt (38) is positioned further toward the front of the vehicle body than the front face (32a) of the seat back (32).

6. The battery cooling air intake structure according to claim 1 or claim 2, wherein the predetermined gap (b) is formed by projectingly providing a gap-forming member (35e, 35f), which abuts against a rear face of the seat belt (38), on the front face (35a) of the interior member (35) on which the intake port (36) is provided, to thus allow the seat belt (38) in a non-used state to be lifted from the intake port (36) toward the front of the vehicle body.

7. The battery cooling air intake structure according to claim 6, wherein an extremity portion of the gap-forming member (35e) abutting against the rear face of the seat belt (38) is positioned further toward the front of the vehicle body than the front face (32a) of the seat back (32).

8. The battery cooling air intake structure according to claim 1 or claim 2, wherein the intake port (36) is inclined so that the lower it is the further it is positioned toward the front of the vehicle body, and is inclined so that the further inside it is in the vehicle width direction the further it is positioned toward the rear of the vehicle body.

9. The battery cooling air intake structure according to claim 1 or claim 2, wherein a lower face of an inlet portion (19a) of an intake duct (19) extending to the rear of the vehicle body from the intake port (36) is inclined so that the side to the rear of the vehicle body is higher.

10. The battery cooling air intake structure according to claim 1 or claim 2, wherein a rear face of the door (34) disposed to one side of the seat (33) is disposed so that, when viewed in the vehicle body fore-and-aft direction, the rear face overlaps part of the intake port (36) on the outer side in the vehicle width direction and, when viewed in the vehicle width direction, a predetermined gap (d) is formed between the rear face and the intake port (36).

11. The battery cooling air intake structure according to claim 1 or claim 2, wherein an auxiliary intake port (40) communicating with the intake duct (19) extending toward the rear of the vehicle body from the intake port (36) is provided on a portion of the interior member (35) facing a side face of the seat back (32).

* * * * *